United States Patent [19]
Katagawa

[11] Patent Number: 5,010,569
[45] Date of Patent: Apr. 23, 1991

[54] TELEPHONE-CALL DISTRIBUTOR
[75] Inventor: Hiromi Katagawa, Fukuoka, Japan
[73] Assignee: Matsushita Electric Industrial Co., Ltd., Kadoma, Japan
[21] Appl. No.: 388,446
[22] Filed: Aug. 2, 1989
[30] Foreign Application Priority Data Aug. 3, 1988 [JP] Japan .............................. 63-194074
Aug. 3, 1988 [JP] Japan .............................. 63-194075
Aug. 3, 1988 [JP] Japan .............................. 63-194076

[51] Int. Cl.⁵ .......................................... H04M 9/00
[52] U.S. Cl. .................................. 379/210; 379/229; 379/283; 379/342
[58] Field of Search ............... 379/282, 283, 281, 286, 379/341, 342, 229, 210, 211, 212

[56] References Cited
U.S. PATENT DOCUMENTS 3,988,547 10/1976 Cicognani et al. ............. 379/281 X
4,029,907 6/1977 Jorgensen et al. .............. 379/342 X
4,311,878 1/1982 Berkowitz et al. ............. 379/281 X
4,555,599 11/1985 Hackett-Jones et al. ....... 379/342 X Primary Examiner—James L. Dwyer
Attorney, Agent, or Firm—Cushman, Darby & Cushman

[57] ABSTRACT

In a telephone-call distributor of the present invention, a dial data signal to be transmitted is generated by a control unit (1301, 2301, 3301) and DTMF signal generator (1328, 3328) in accordance with the dial data given to the control unit through a DTMF signal receiver (1327, 2323, 3327).

12 Claims, 13 Drawing Sheets

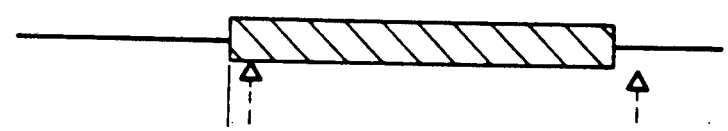
FIG.3 (a)
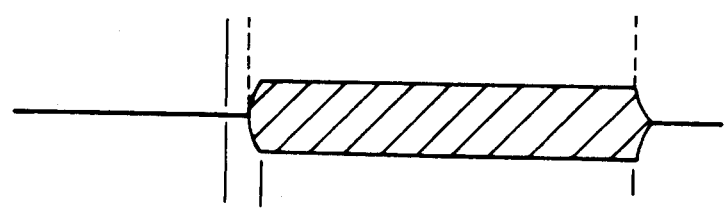
FIG.3 (b)
FIG.3 (c)
FIG.3 (d)
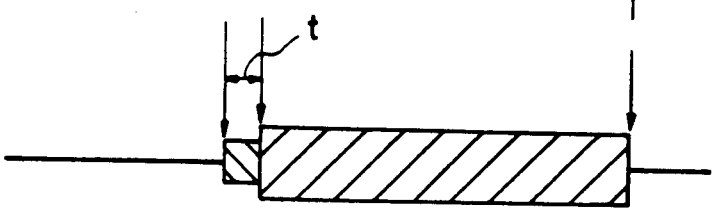

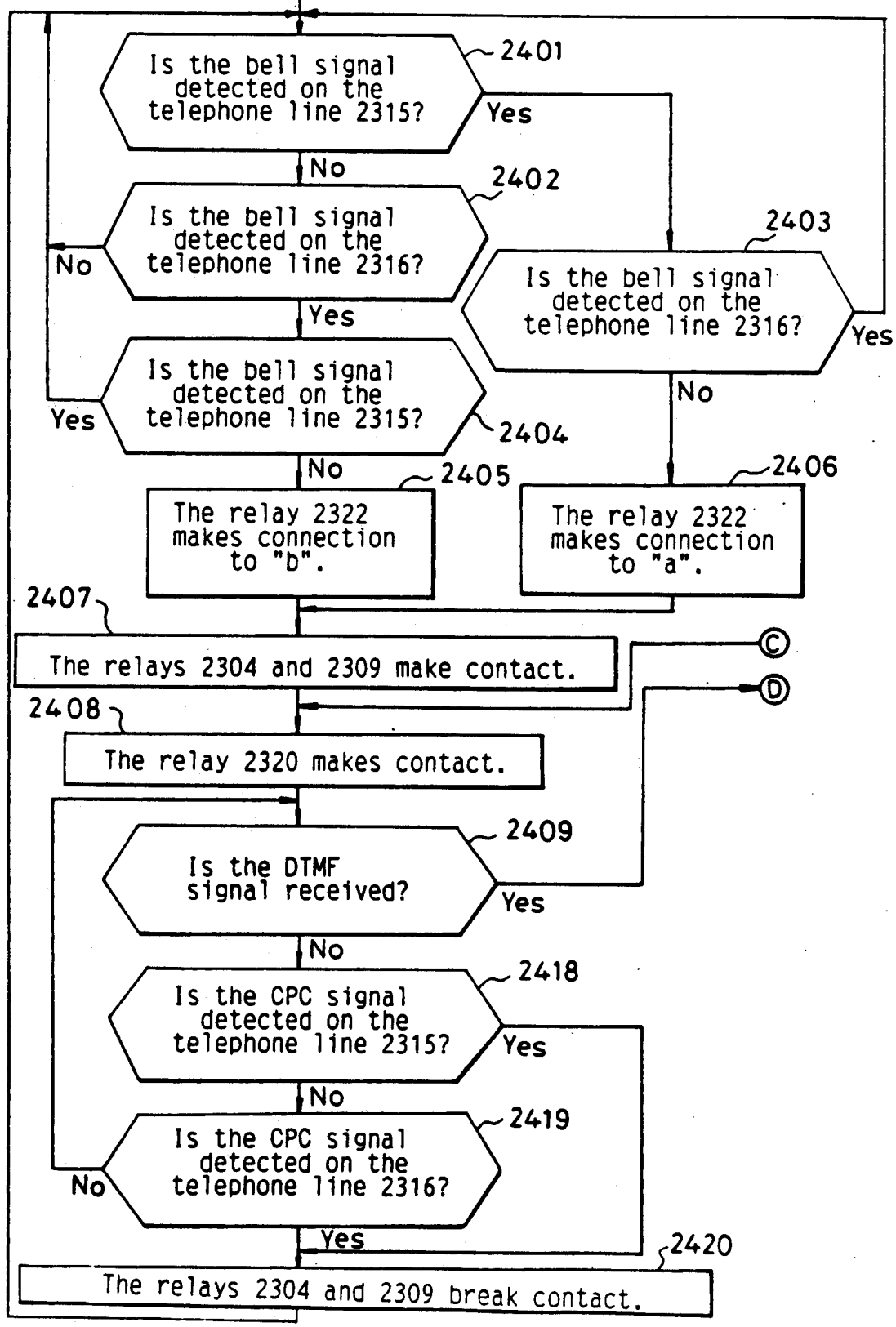

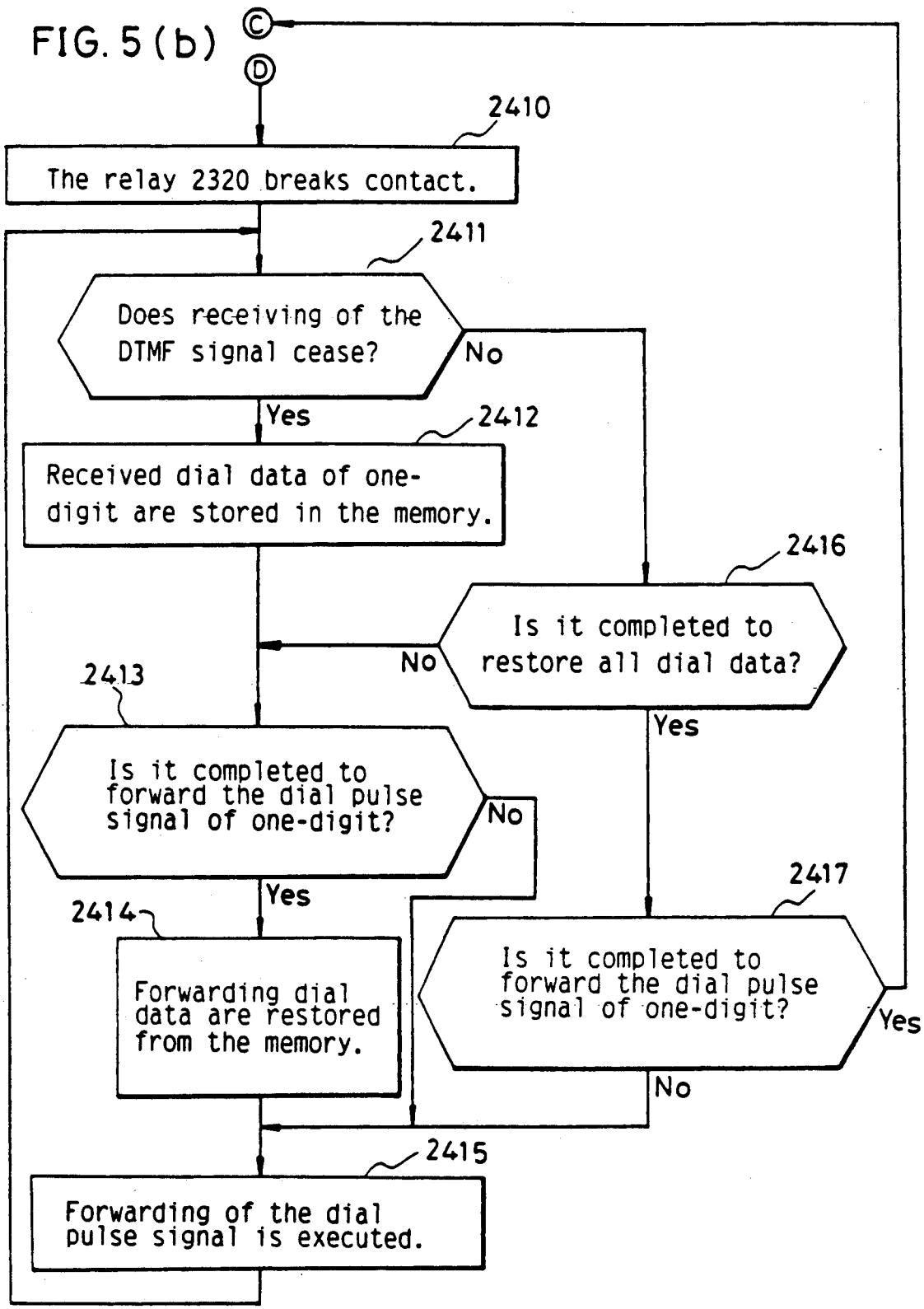

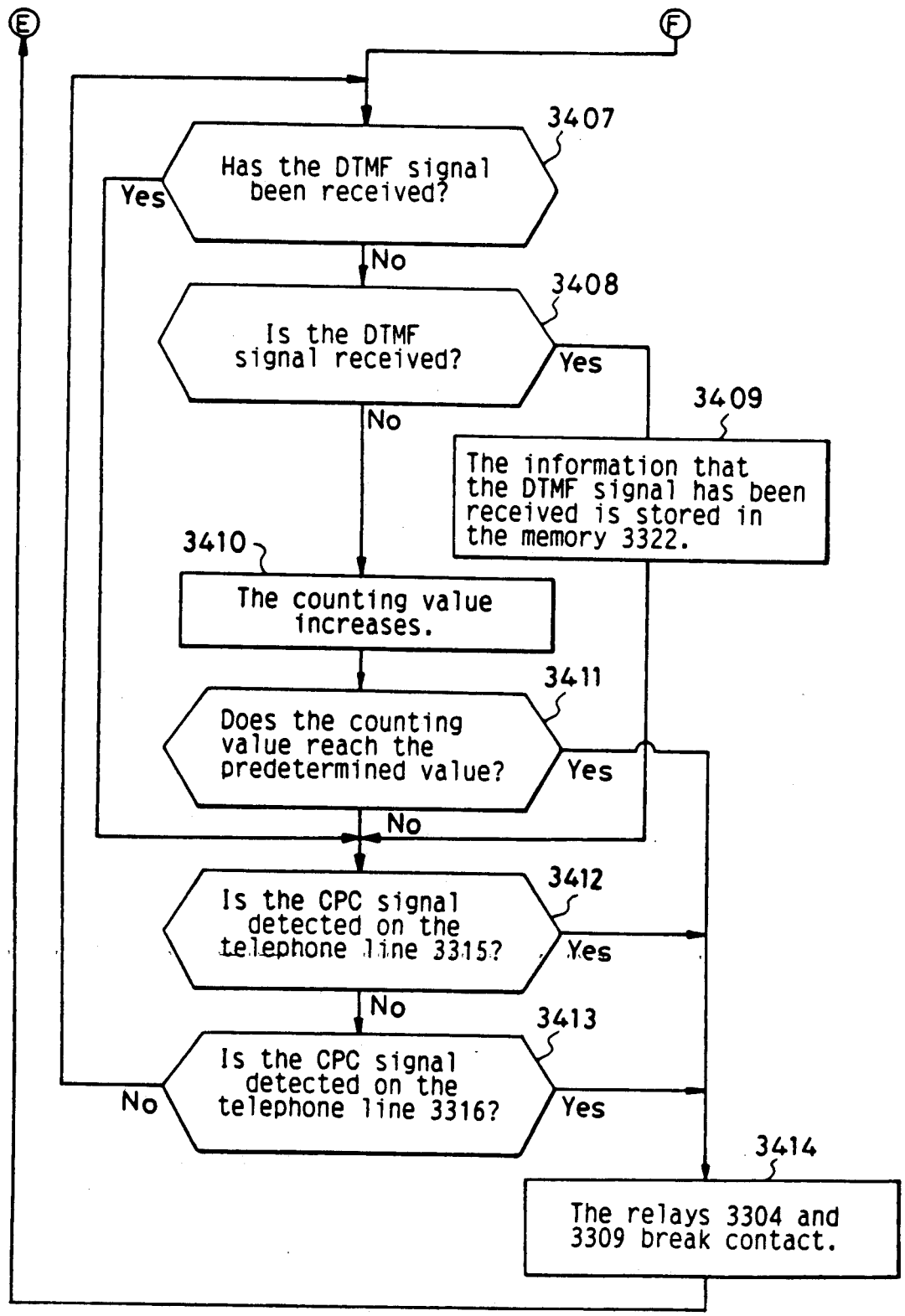

TELEPHONE-CALL DISTRIBUTOR

FIELD OF THE INVENTION AND RELATED ART STATEMENT

1. Field of the Invention

This invention relates to a telephone-call distributor which is to be connected with at least two telephone lines to forward a telephone-call by receiving dual tone modified frequency signal (hereinafter is referred to as DTMF signal) which is transmitted from one of the telephone lines and forwarding it to the other telephone line.

2. Description of the Related Art

FIG. 9 is a block diagram showing the conventional telephone-call distributor. In the figure, the telephone-call distributor 100 comprises several parts encircled by a chain line. A bell signal detector 103 detects a bell signal transmitted from a telephone exchanger 116 through a telephone line 117 and a capacitor 102 which is provided to cut off D.C. signal. Output signal of the bell signal detector 103 is inputted to a control unit 101 and used to judge the presence of a call. A relay 104, which is provided to seize the telephone line 117, is controlled by the control unit 101 to make/break a D.C. loop including the telephone exchanger 116, thereby deciding to transmit, receive or terminate the call. A CPC signal detector 105 is provided to detect an instantaneous break of a D.C. loop current (hereinafter is referred to as CPC (Calling Party Control) signal) which is transmitted from the telephone exchanger 116 through the telephone line 117. This instantaneous break is caused by the hanging-up of the receiver. When the instantaneous break is detected, the CPC signal detector 105 informs the control unit 101 of the detection of the instantaneous break. A capacitor 106 is provided to cut off the D.C. current of the telephone line 117 and transmit only voice band data to an internal telephone line 124.

Functions of a capacitor 107 connected with a telephone line 118, a bell signal detector 108, a relay 109, a CPC signal detector 110 and a capacitor 111 are quite similar to functions of the capacitor 102, the bell signal detector 103, the relay 104, the CPC signal detector 105 and the capacitor 106, respectively. The internal telephone line 124 connects the capacitor 106 with the capacitor 111 to thereby connect the telephone lines 117 and 118 in the voice band communication.

A telephone set 112 is placed under the control of a telephone exchanger 114 and connected to the telephone exchanger 114 via a telephone line 113. The telephone exchanger 114 and the telephone exchanger 116 are connected each other through a commercial communication line 115.

Functions of a telephone set 123, a telephone line 122, a telephone exchanger 121 and a commercial communication line 120 are quite similar to functions of the telephone set 112, the telephone line 113, the telephone exchanger 114 and the commercial communication line 115.

Hereafter, operation of the above-mentioned conventional telephone-call distributor 100 is described with reference to a flow chart shown in FIG. 10. When execution of the flow chart is started (step 200), judgment of whether a bell signal is detected or not in the telephone line 117 is executed in a step 201. When the bell signal is detected, a step-advance to the next step 203 is executed. When the bell signal is not detected, a step-advance to the next step 202 is executed. In the step 202, judgement of whether the bell signal is detected on the telephone line 118 or not is executed by the bell signal detector 108. When the bell signal is not detected, return to the step 201 is executed, and monitoring of the bell signal on the telephone lines 117 and 118 is repeated. When the bell signal is detected in the step 202, a step-advance to the next step 204 is executed. After making the step-advance from the step 201 to the step 203 in the presence of the bell signal on the telephone line 117, judgement of whether the bell signal is detected or not in the telephone line 118 is executed in the step 203, thereby to check whether it is possible to seize the telephone line 118 as a transmittal line. If the bell signal exists on the telephone line 118, there occurs a conflict of calls. To avoid such conflict, return to the step 201 is executed without seizing the telephone line 118, and watching of the bell signal on the telephone lines 117 and 118 is executed again. When the bell signal is not detected on the telephone line 118 in the step 203, it is possible to seize the telephone line 118 as the transmittal line. A step-advance to a step 205 is therefore executed, and the relay 104 and the relay 109 become ON-state. The telephone line 117 is thereby seized as a call line and the telephone line 118 is seized as the transmittal line. This means a state such that a caller can access the telephone line 118 from the telephone set 112 via the telephone line 113, the telephone exchanger 114, the commercial communication line 115, the telephone exchanger 116 and the telephone line 117. The caller controls the telephone exchanger 119 with DTMF signal which is transmitted from the telephone set 112 via the telephone line 113, the telephone exchanger 114, the commercial communication line 115, the telephone exchanger 116, the telephone line 117, the relay 104, the capacitor 106, the internal telephone line 124, the capacitor 111, the relay 109 and the telephone line 118. At that time, the telephone exchanger 119 analyzes the DTMF signal transmitted from the telephone set 112 and selects the telephone exchanger 121, which controls the desired telephone set 123, via the commercial communication line 120. Upon receipt of control signal from the telephone exchanger 119, the telephone exchanger 121 transmits a bell signal to the desired telephone set 123 via the telephone line 122. When a person picks up a receiver of the telephone set 123, a telephone-call is realized. This telephone-call is terminated by hanging up one of the receiver of the two telephone sets 112 and 123, and the CPC signal is transmitted to the telephone-call distributor 100 from the telephone exchanger 116 or 119 controlling the telephone set 112 or 123 whose receiver is hung up earlier than the other one. In steps 206 and 207, watching of the CPC signals of the telephone lines 117 and 118 is executed by the CPC signal detectors 105 and 110, respectively. Until the CPC signal is detected, execution of the steps 206 and 207 is repeated. In one of the steps 206 and 207, when the CPC signal is detected by the CPC signal detector 105 or 110, a step-advance to a step 208 is executed. In the step 208, the relays 104 and 109 become OFF-state, and the telephone lines 117 and 118 are released to finish the telephone call. After that, return to the step 201 is executed, and watching of the bell signal is carried out again.

Watching of the bell signal on the telephone line 117 in the step 204 is the similar procedure to that of the step 203. When the bell signal is detected on the telephone line 117, return to the step 201 is executed in order to avoid the conflict of calls, and watching of the bell signal is repeated. When the bell signal is not detected on the telephone line 117, a step-advance to the step 205 is executed. In the step 205, the relays 104 and 109 become ON-state, thereby to seize the telephone lines 118 and 117 as the call line and the transmittal line, respectively. The following operation is carried out in a similar manner to the aforementioned case that the telephone lines 117 is the call line and the telephone line 118 is the transmittal line, except that situation of the telephone lines 117 and 118 is contrary.

As mentioned above, the conventional telephone-call distributor 100 directly forwards the DTMF signal, which is transmitted from the caller's telephone set, to the telephone exchanger of the transmittal side via the telephone exchanger of the caller's side and the telephone-call distributor 100.

However, in the above-mentioned conventional telephone-call transferring apparatus 100, level of the DTMF signal inevitably attenuates due to connection loss of the telephone exchangers (114 and 116) or (121 and 119) and transmission loss of the commercial communication line 115 or 120. Even if connection loss in the telephone-call distributor 100 is zero dB, in a case such that the distance between the caller and the telephone-call distributor 100 is long, level of the DTMF signal lowers below a level necessary for operating the telephone exchanger 116 or 119 of the transmittal side which receives the DTMF signal transmitted from the caller, thereby resulting in an undesirable state that the telephone exchanger 116 or 119 of the transmittal side does not operate normally.

OBJECT AND SUMMARY OF THE INVENTION

An object of the present invention is to offer a telephone-call distributor which can surely forward the dial data signal to the telephone line seized as the transmittal line.

In order to achieve the above-mentioned object, the telephone-call distributor of the present invention comprises:

signal receiving means for receiving a dial data signal coming from a first telephone line;

signal generating means for generating a dial data signal having the same code as that of the dial data signal received by the signal receiving means; and forwarding means for forwarding the dial data signal generated by the signal generating means to a second telephone line.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 3(a), 3(b), 3(c) and 3(d) are time charts showing a DTMF signal inputted to a DTMF signal receiver 1327 shown in FIG. 1, a DTMF signal issued from a DTMF signal generator 1327 shown in FIG. 1, a control signal for a relay 1326 shown in FIG. 1 and a signal arose on a contact terminal "g" of the relay 1326, respectively.

FIGS. 5(a) and 5(b) coupled to each other constitutes a flow chart showing operation of the telephone-call distributor shown in FIG. 4.

FIGS. 8(a) and 8(b) coupled to each other constitutes a flow chart showing operation of the telephone-call distributor shown in FIG. 7.

DESCRIPTION OF THE PREFERRED EMBODIMENT

Hereafter, preferred embodiments of the present invention are described with reference to the accompanying drawings.

Figure 1:
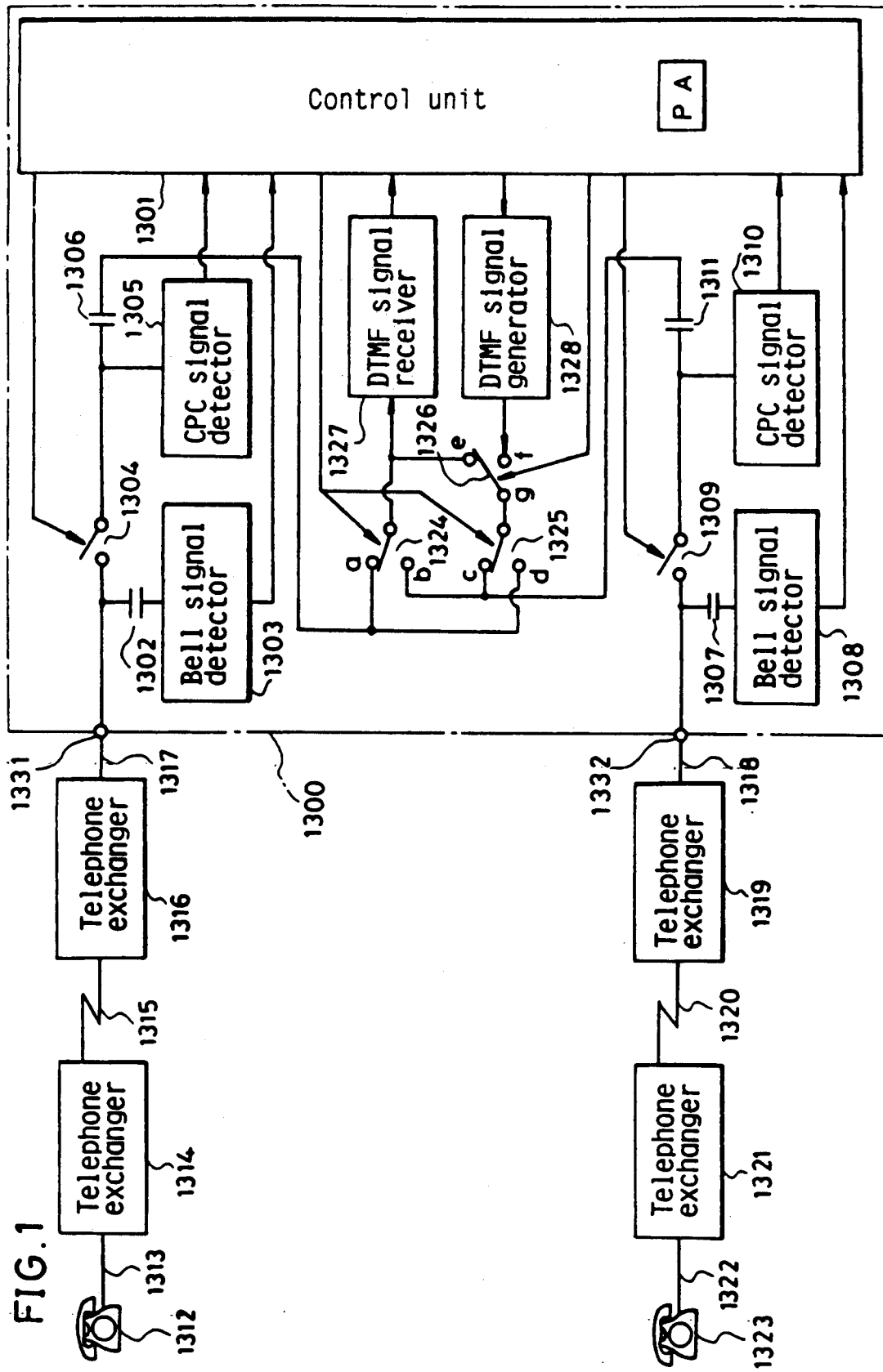
FIG. 1 is a block diagram showing a telephone-call system including a telephone-call distributor of a first embodiment of the present invention.

FIG. 1 is a block diagram showing a telephone-call system including a telephone-call distributor 1300 of the present invention. The telephone-call distributor 1300 comprises several parts encircled by a chain line and a pair of terminals 1331 and 1332. A bell signal detector 1303 detects a bell signal transmitted from a telephone exchanger 1316 through a telephone line 1317 and a capacitor 1302 which is provided to cut off D.C. signal. Output signal of the bell signal detector 1303 is inputted to a control unit 1301 in order to inform the presence of call. A relay 1304, which is provided to seize the telephone line 1317, is controlled by the control unit 1301 to make/break a D.C. loop including the telephone exchanger 1316, thereby deciding to transmit, receive or terminate. The control unit 1301 includes a program area PA for storing a control program represented by a flow chart shown in FIGS. 2(a) and 2(b). A CPC signal detector 1305 detects a CPC signal transmitted from the telephone exchanger 1316 via the telephone line 1317 and informs the control unit 1301 of the detection of CPC signal. A capacitor 1306 is provided to cut off D.C. current on the telephone line 1317 and transmit only voice band signal through a line between the telephone line 1317 and a contact terminal "a" of a relay 1324 or a contact terminal "d" of a relay 1325. Functions of a capacitor 1307 connected to a telephone exchanger 1319 through a telephone line 1318, a bell signal detector 1308, a relay 1309 and a CPC signal detector 1310 are quite similar to functions of the capacitor 1302, the bell signal detector 1303, the relay 1304 and the CPC signal detector 1305, respectively. A capacitor 1311 is provided to cut off D.C. current on the telephone line 1318 and transmit only voice band signal through a line between the telephone line 1318 and a contact terminal "b" of the relay 1324 or a contact terminal "c" of the relay 1325. The relays 1324 and 1325 are controlled by the control unit 1301.

A DTMF signal receiver 1327 is connected to the relay 1324 and is alternatively connected to the contact terminal "a" or "b" of the relay 1324, thereby to receive the DTMF signal coming from any one of the telephone lines 1317 and 1318. Received data (output of the DTMF signal receiver 1327) are inputted to the control unit 1301. The relay 1324 is connected to the relay 1325 through a contact terminal "e" of a relay 1326, thereby realizing a connection for talking between the telephone lines 1317 and 1318 in the voice band. A DTMF signal generator 1328 is controlled by the control unit 1301 to issue a DTMF signal having the same signal code as the DTMF signal received by the DTMF signal receiver 1327. An output signal of the DTMF signal generator 1328 is applied to a contact terminal "f" of the relay 1326. The relay 1326 is controlled by the control unit 1301 to make a connection between the telephone lines 1317 and 1318 through the contact terminal "e" except the time when the DTMF signal is issued from the DTMF signal generator 1328.

A telephone set 1312 is placed under the control of a telephone exchanger 1314 and connected thereto via a telephone line 1313. The telephone exchanger 1314 and the telephone exchanger 1316 are connected to each other through a commercial communication line 1315.

A telephone set 1323 is placed under the control of a telephone exchanger 1321 and connected to the telephone exchanger 1321 via a telephone line 1322. The telephone exchanger 1321 and the telephone exchanger 1319 are connected each other through a commercial communication line 1320.

Figure 2A:
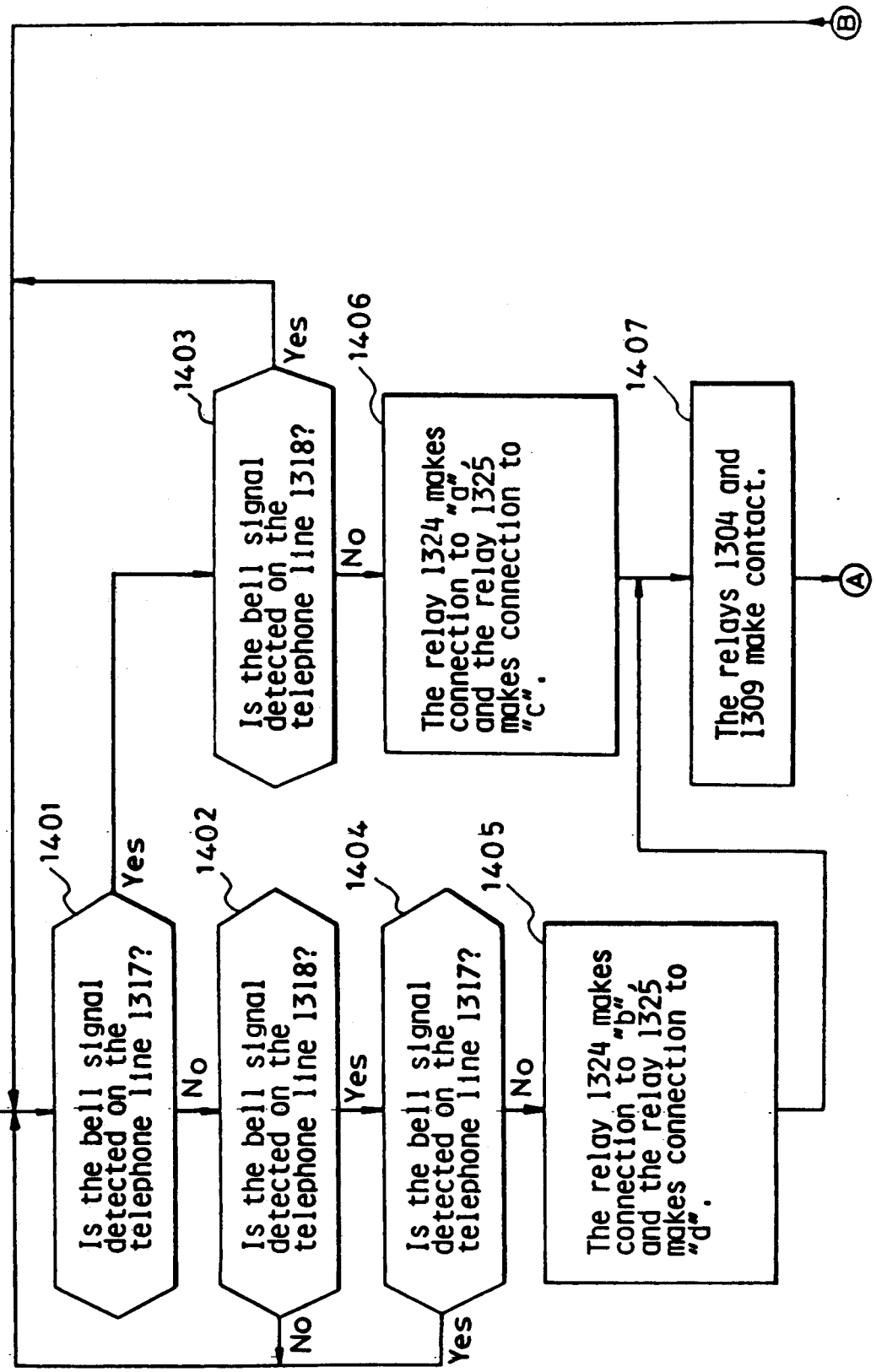
FIGS. 2(a) and 2(b) coupled to each other constitutes a flow chart showing operation of the telephone-call distributor shown in FIG. 1.
Figure 2B:
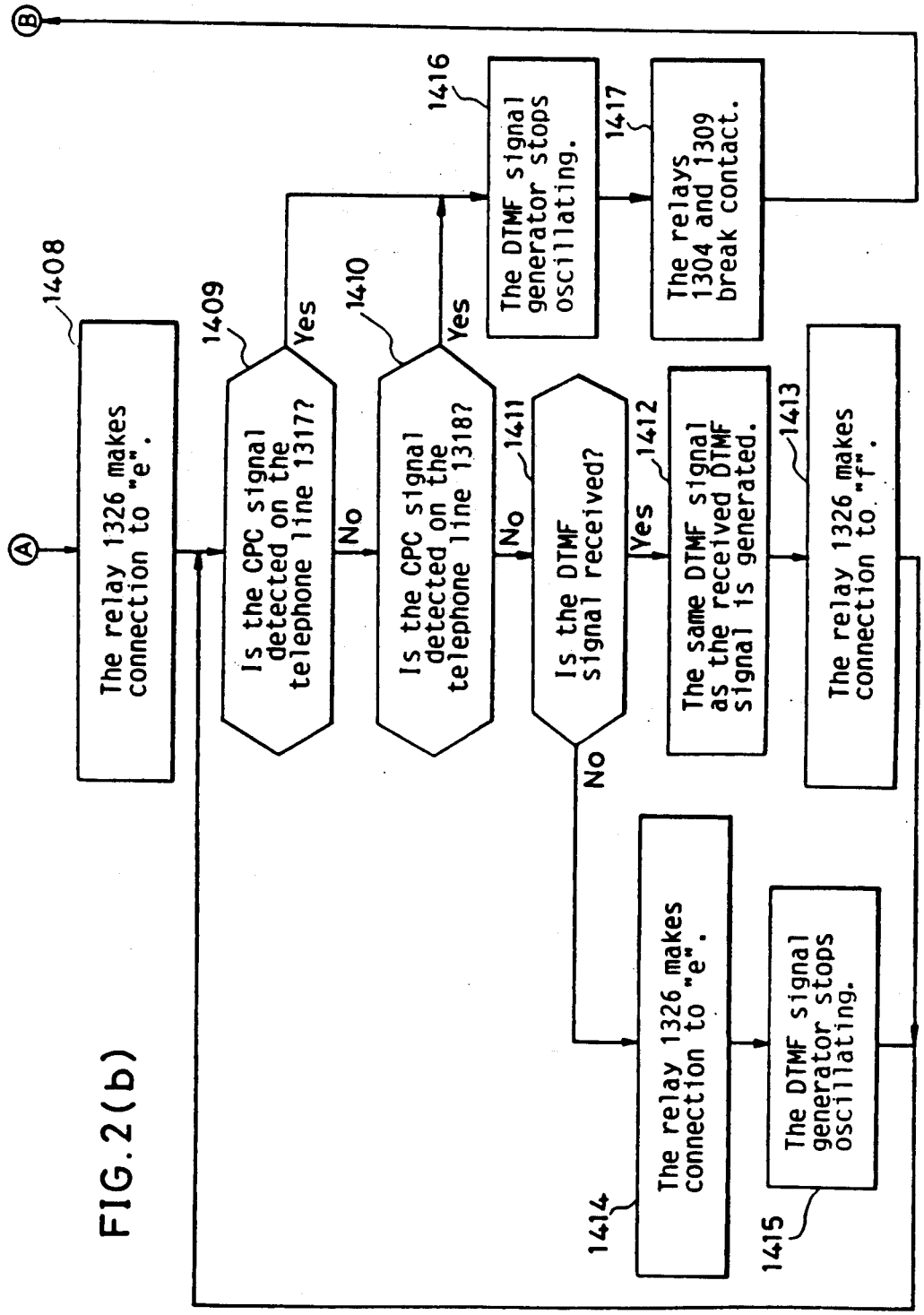

FIG. 2(a) and FIG. 2(b) coupled to each other constitutes a flow chart showing operation of the above-mentioned telephone-call distributor 1300. In an initial step 1401, judgement of whether a bell signal is detected or not on the telephone line 1317 is executed through the bell signal detector 1303. When the bell signal is not detected, a step-advance to the next step 1402 is executed. When the bell signal is detected, another step-advance to a step 1403 is executed. In the step 1402, judgement of whether the bell signal is detected or not on the telephone line 1318 is executed through the bell signal detector 1308. When the bell signal is not detected, return to the initial step 1401 is executed, and watching of the bell signal on the telephone lines 1317 and 1318 is carried out again. When the bell signal is detected in the step 1402, a step-advance to the next step 1404 is executed. When the step-advance from the step 1401 to the step 1403 is executed through detection of the bell signal on the telephone line 1317, judgement of whether the bell signal is detected or not on the telephone line 1318 is executed in the step 1403, thereby to check whether it is able to seize the telephone line 1318 as a transmittal line. If the bell signal exists on the telephone line 1318, there occurs a conflict of calls. To avoid such conflict, return to the step 1401 is executed without seizing the telephone line 1318, and watching of the bell signal on the telephone lines 1317 and 1318 is executed again. When the bell signal is not detected on the telephone line 1318 in the step 1403, it is possible to seize the telephone line 1318 as the transmittal line. A step-advance to a step 1406 is therefore executed, and the relay 1324 makes connection to the contact terminal "a" and the relay 1325 makes connection to the contact terminal "c". The DTMF signal receiver 1327 is thereby connected to the telephone line 1317, and the DTMF signal generator 1328 is disposed to be connected to the telephone line 1318. In the next step 1407, the relay 1304 makes contact (to ON-state) to thereby seize the telephone line 1317 as a call line, and the relay 1309 makes contact (to ON-state) to thereby seize the telephone line 1318 as a transmittal line. In a step 1408, the relay 1326 makes connection to the contact terminal "e". At that time, dial tone is forwarded to the caller's telephone set 1312 from the telephone exchanger 1319 via the telephone line 1318. Therefore, a tone reaching the caller through his receiver changes from a ringback tone to the dial tone. In steps 1409 and 1410, watchings of CPC signals on the telephone lines 1317 and 1318 are executed by the CPC signal detectors 1305 and 1310, respectively. If the CPC signal is not detected in the steps 1409 and 1410, a step-advance to the next step 1411 is executed. In the step 1411, watching of the DTMF signal is executed by the DTMF signal receiver 1327. When the DTMF signal is not received, a step-advance to the next step 1414 is executed, and the relay 1326 keeps connection to the contact terminal "e".

In the next step 1415, the DTMF signal generator keeps on stoppage of oscillation, and return to the step 1409 is subsequently executed. Thereafter, until the DTMF signal is detected, the step 1409, 1410, 1411, 1414 and 1415 are repeatedly executed.

FIGS. 3(a), 3(b), 3(c) and 3(d) are time charts showing the DTMF signal inputted to the DTMF signal receiver 1327, the DTMF signal issued from the DTMF signal generator 1328, a control signal for the relay 1326 and a signal arose on a contact terminal "g" of the relay 1326, respectively.

In the step 1411, when the DTMF signal is detected, a step-advance to a step 1412 is executed. In the step 1412, the control unit 1301 gives the same signal code as that of the received DTMF signal to the DTMF signal generator 1328. At that time, since the relay 1326 keeps connection to the contact terminal "e", the original DTMF signal is directly transmitted to the telephone line 1318 during a time period t which is needed to detect the DTMF signal as shown by a signal waveform in FIG. 3(d). In the next step 1413, the relay 1326 makes connection to the contact terminal "f". After that, the relay 1326 keeps connection to the contact terminal "f" as long as receiving of the DTMF signal continues. The DTMF signal generated in the DTMF signal generator 1328 is thereby continually forwarded to the telephone exchanger 1319 through the telephone line 1318. After execution of the step 1413, return to the step 1409 is executed, and the steps 1409, 1410, 1411, 1412 and 1413 are repeatedly executed. In the step 1411, when the DTMF signal ceases, step-advances to the step 1414 and the subsequent step 1415 are executed. In the step 1414, the relay 1328 makes connection to the contact terminal "e", so that the DTMF signal forwarded to the telephone line 1318 is stopped. In the step 1415, oscillation in the DTMF signal generator 1328 stops.

After speaking over the caller's telephone set 1312 and the called telephone set 1323, when one of the caller and the called person hangs up the receiver, the CPC signal is generated on the telephone line 1317 or 1318. When the CPC signal is detected on the telephone line 1317 or 1318 at the step 1409 or 1410, a step-advance to a step 1416 is executed, and oscillation in the DTMF signal generator 1328 stops. This step 1416 is necessary to stop oscillation of the DTMF signal generator 1328 at the time when the CPC signal is detected by the CPC signal detector 1305 or 1310 during oscillation of the DTMF signal. Next, a step-advance to a step 1417 is executed, and the relays 1304 and 1309 break contact (to OFF-state), thereby releasing the telephone lines 1317 and 1318. Talkable state is thus terminated. After that, return to the step 1401 is executed, and watching of the next bell signal on the telephone lines 1317 and 1318 is carried out.

In the step 1402, when the bell signal is detected on the telephone line 1318, a step-advance to the step 1404 is executed, and watching of the bell signal on the telephone line 1317 is carried out. When the bell signal is detected on the telephone line 1317, return to the step 1401 is executed in order to avoid conflict of calls from both telephone lines 1317 and 1318, and watching of these telephone lines 1317 and 1318 is continued. When the bell signal is not detected on the telephone line 1317 at the step 1404, a step-advance to a step 1405 is executed. In the step 1405, the relay 1324 makes connection to a contact terminal "b", and the relay 1325 makes connection to a contact terminal "d". Thus, the DTMF signal receiver 1327 is connected to the telephone line 1318 of the caller's side, and the DTMF signal generator 1328 is disposed to be connected to the telephone line 1317 of the transmittal side. Subsequent steps are same as the steps of the case that the telephone line 1317 is of the caller's side and the telephone line 1318 is of the transmittal side except contrariness of situation of the caller and the called.

In the above-mentioned construction, if there is a long distance between the caller and the telephone-call distributor 1300, level of the DTMF signal transmitted from the caller's telephone set 1312 or 1323 attenuates through connection loss of the telephone exchangers (1314 and 1316) or (1321 and 1319) and transmission loss of the commercial communication line 1315 or 1320. However, since the DTMF signal forwarded to the telephone line 1318 or 1317 of the transmittal side is newly generated in the DTMF signal generator 1328 according to the received DTMF signal, this DTMF signal is not affected by the above-mentioned attenuation. Therefore, calling for the telephone set 1323 (or 1312) from the telephone set 1312 (or 1323) is surely carried out.

Next, a second embodiment of the present invention is described with reference to FIGS. 4, 5, 6 and 7.

Figure 4:
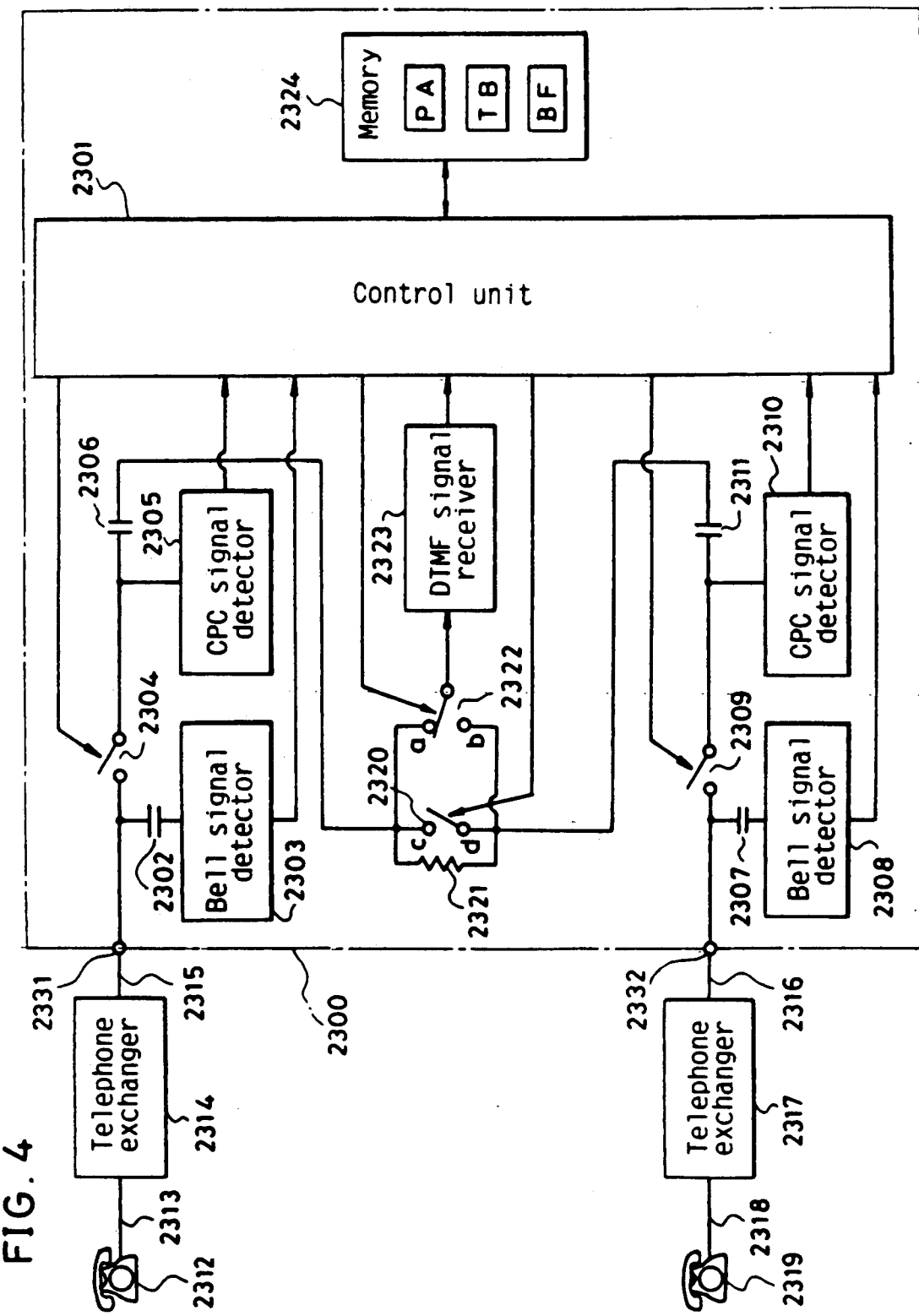
FIG. 4 is a block diagram showing a telephone-call system including a telephone-call distributor of a second embodiment of the present invention.
Figure 6:
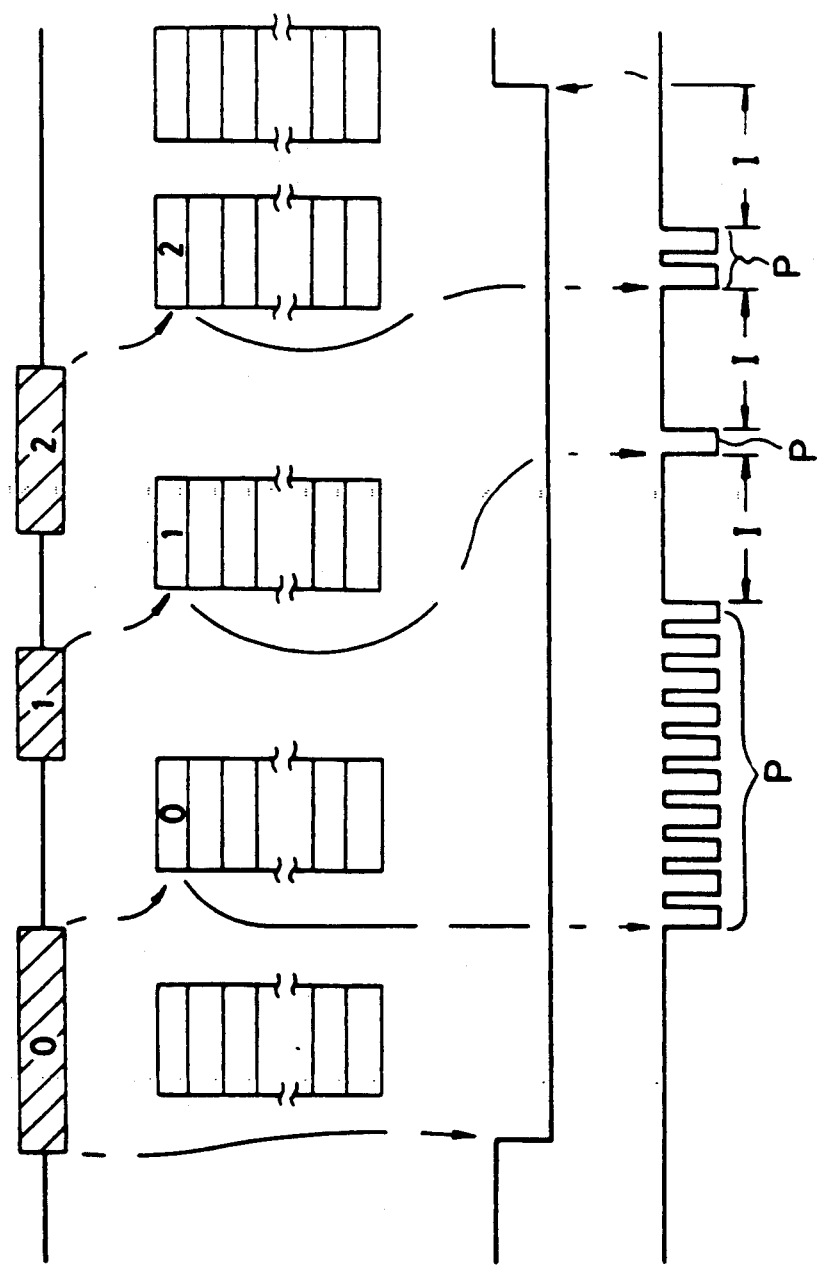
FIGS. 6(a), 6(c) and 6(d) are time charts showing a signal waveform on a telephone line 2315 shown in FIG. 4, operation of a relay 2320 shown in FIG. 4 and an output waveform to a telephone line 2316 shown in FIG. 4, respectively.
FIG. 6(b) is an illustration showing stored data in a buffer BF of a memory 2324 shown in FIG. 4.

FIG. 4 is a block diagram showing a telephone-call system including a telephone-call distributor 2300 of the present invention. The telephone-call distributor 2300 comprises several parts encircled by a chain line and a pair of terminals 2331 and 2332. A bell signal detector 2303 detects a bell signal transmitted from a telephone exchanger 2314 through a telephone line 2315 and a capacitor 2302 which is provided to cut off D.C. signal. Output signal of the bell signal detector 2303 is inputted to a control unit 2301 in order to inform the presence of call. A relay 2304, which is provided to seize the telephone line 2315, is controlled by the control unit 2301 to make/break a D.C. loop including the telephone exchanger 2314, thereby deciding to transmit, receive or terminate. When the relay 2304 serves to seize the telephone line of the transmittal side, the relay 2304 intermittently makes the D.C. loop to thereby generate a dial pulse signal. A CPC signal detector 2305 detects a CPC signal transmitted from the telephone exchanger 2314 via the telephone line 2315 and informs the control unit 2301 of the detection of CPC signal. A capacitor 2306 is provided to cut off D.C. current on the telephone line 2315 and transmit only voice band signal through a line between the telephone line 2315 and a contact terminal "c" of a relay 2320 or a contact terminal "a" of a relay 2322. Functions of a capacitor 2307 connected to a telephone exchanger 2317 through a telephone line 2316, a bell signal detector 2308, a relay 2309 and a CPC signal detector 2310 are quite similar to functions of the capacitor 2302, the bell signal detector 2303, the relay 2304 and the CPC signal detector 2305, respectively. A capacitor 2311 is provided to cut off D.C. current on the telephone line 2316 and transmit only voice band signal through a line between the telephone line 2316 and a contact terminal "d" of the relay 2320 or a contact terminal "b" of the relay 2322. The relays 2320 and 2322 are controlled by the control unit 2301. A resistor 2321 is parallelly connected with the relay 2320 so as to bypass the relay 2320 with a predetermined resistance. At the time of talking over the telephone between the telephone lines 2315 and 2316, the resistor 2321 is short-circuited by making contact of the relay 2320 in order to prevent attenuation of level of the voice band signal. During forwarding of the dial pulse signal to the telephone line of the transmittal side, the relay 2320 breaks contact so that the dial pulse signal passes through the resistor 2321. As aforementioned, the dial pulse signal is forwarded by intermittently making the D.C. loop. Therefore, D.C. current is intermittently interrupted, and intermittent noise is thereby generated. This intermittent noise reaches the telephone line 2315 or 2316 of the caller's side from the telephone line 2316 or 2315 of the transmittal side. The resistor 2321 serves to reduce such noise considerably. A DTMF signal receiver 2323 is connected to the relay 2322 and is alternatively connected to the contact terminal "a" or "b" by the control of the control unit 2301. When the relay 2322 makes connection to the contact terminal "a", the DTMF signal receiver 2323 receives the DTMF signal coming from the telephone line 2315. When the relay 2322 makes connection to the contact terminal "b", the DTMF signal receiver 2323 receives the DTMF signal coming from the telephone line 2316. Received data (output of the DTMF signal receiver 2323) are inputted to the control unit 2301. Since the relay 2320 is opened during receiving of the DTMF signal, the DTMF signal coming from the telephone line 2315 or 2316 of the caller's side is protected from the intermittent noise caused by the dial pulse signal. A memory 2324, which is accessed by the control unit 2301, comprises a buffer BF, a program area PA and a table area TB. The buffer BF stores data of the received DTMF signal. The program area PA stores a control program represented by a flow chart shown in FIG. 5(a) and FIG. 5(b). The table area TB stores a conversion table shown in the following Table 1. The received DTMF signal is converted into the dial pulse signal to be forwarded in accordance with the Table 1.

TABLE 1

| DTMF signal | Dial pulse signal |
| --- | --- |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 10 |
| * | Nothing |
| # | |

The buffer BF is necessary in order to assist the conversion at the time when the DTMF signal is converted into the dial pulse signal. Because a forwarding speed of the dial pulse signal is slower than a receiving speed of the DTMF signal. For instance, it takes one second by the dial pulse signal of 10PPS to foward 10 pulses. Therefore, the DTMF signal of high speed is firstly stored in the buffer BF of the memory 2324 one after another, and subsequently, the stored DTMF signal is converted into the dial pulse signal of low speed in accordance with the conversion table, thereby forwarding to the telephone line 2315 or 2316 of the transmittal side. For example, when the DTMF signal is a signal of zero, it is converted into the dial pulse signal of 10 pulse as shown in Table 1. When the DTMF signal is a special signal of "*" or "#", it is handled as a no pulse signal and disregarded without storing in the buffer BF.

A telephone set 2312 is placed under the control of the telephone exchanger 2314 and connected to the telephone exchanger 2314 via a telephone line 2313.

A telephone set 2319 is placed under the control of the telephone exchanger 2317 and connected to the telephone exchanger 2317 via a telephone line 2318.

FIG. 5(a) and FIG. 5(b) coupled to each other constitutes a flow chart showing operation of the abovementioned telephone-call distributor 2300. In an initial step 2401, judgement of whether a bell signal is detected or not on the telephone line 2315 is executed through the bell signal detector 2303. When the bell signal is not detected, a step-advance to the next step 2402 is executed. When the bell signal is detected, another step-advance to a step 2403 is executed. In the step 2402, judgement of whether the bell signal is detected or not on the telephone line 2316 is executed through the bell signal detector 2308. When the bell signal is not detected, return to the initial step 2401 is executed, and watching of the bell signal on the telephone lines 2315 and 2316 is carried out again. When the bell signal is detected in the step 2402, a step-advance to the next step 2404 is executed. When the step-advance from the step 2401 to the step 2403 is executed through detection of the bell signal on the telephone line 2315, judgement of whether the bell signal is detected or not on the telephone line 2316 is executed in the step 2403, thereby to check whether it is able to seize the telephone line 2316 as a transmittal line. If the bell signal exists on the telephone line 2316, there occurs a conflict of calls. To avoid such conflict, return to the step 2401 is executed without seizing the telephone line 2316, and watching of the bell signal on the telephone lines 2315 and 2316 is executed again. When the bell signal is not detected on the telephone line 2316 in the step 2403, it is possible to seize the telephone line 2316 as the transmittal line. A step-advance to a step 2406 is therefore executed, and the relay 2322 makes connection to the contact terminal "a". The DTMF signal receiver 2323 is thereby connected to the telephone line 2315. In the next step 2407, the relay 2304 makes contact (to ON-state) to thereby seize the telephone line 2315 as a call line, and the relay 2309 makes contact (to ON-state) to thereby seize the telephone line 2316 as a transmittal line. In a step 2408, the relay 2320 makes contact, and the resistor 2321 is thereby short-circuited. At that time, dial tone is forwarded to the caller's telephone set 2312 from the telephone exchanger 2317 via the telephone line 2316. Therefore, a tone reaching the caller through his receiver changes from a ringback tone to the dial tone. In a step 2409, judgement of whether the DTMF signal is received or not is executed through the DTMF receiver 2323. When the DTMF signal is not received, step-advances to the next steps 2418 and 2419 are executed. In the steps 2418 and 2419, watching of the CPC signal on the telephone lines 2315 and 2316 is executed. When the CPC signal is not detected at any of both steps 2418 and 2419, return to the steps 2409 is executed. Thereafter, until the DTMF signal is received or the CPC signal is detected on any one of the telephone lines 2315 and 2316, the steps 2409, 2418 and 2419 are repeatedly executed. When the CPC signal is detected in the step 2418 or 2419, a step-advance to a step 2420 is executed. In the step 2420, both the relays 2304 and 2309 break contact, thereby releasing the telephone lines 2315 and 2316. After that, return to the step 2401 is executed, and watching of the next bell signal on the telephone lines 2315 and 2316 is carried out again.

In the step 2409, when the DTMF signal is received, a step-advance to a step 2410 is executed. In the step 2410, the relay 2320 breaks contact. The intermittent noise of the dial pulse signal forwarded to the telephone line 2316 of the transmittal side is muted toward the telephone line 2315 of the caller's side. Next, judgment of whether receiving of the DTMF signals ceases or not is executed in a step 2411. When receiving of the DTMF signal ceases, a step-advance to the next step 2412 is executed. In the step 2412, dial data of the received DTMF signal of one digit are stored in the memory 2324. In the next step 2413, judgement of whether forwarding of a row of the one-digit dial pulse signal is completed or not is executed. When the forwarding of the row is completed, a step-advance to a step 2414 is executed. In the step 2414, the dial data are stored from the memory 2324 in order to forward the dial pulse signal. When the forwarding of the row of dial pulse signal is not completed at the step 2413, a jumping step-advance to a step 2415 is executed. In the step 2415, forwarding of the dial pulse signal is continued, and the relay 2309 makes and breaks contact intermittently as shown in FIG. 6(d). The row P of the dial pulse signal and an interdigit pause signal I are alternately forwarded. A telephone number of a person to talk to is specified by sequentially forwarding these row P and the interdigit pause signal. When a part of the sequential forwarding is executed, execution passes through the step 2415, and return to the step 2411 is carried out. In the step 2411, when receiving of the DTMF signal is continued, a step-advance to a step 2416 is executed. In the step 2416, judgement of whether restoring of all dial data in the memory 2324 is completed or not is executed. When the dial data exist yet in the memory 2324, a step-advance to the step 2413 is executed. In the step 2413, judgement of whether forwarding of the one-digit dial pulse signal is completed or not is executed. When restoring of all data in the memory 2324 is completed at the step 2416, a step-advance to a step 2417 is executed. In the step 2417, judgement of whether forwarding of the one-digit dial pulse signal is completed or not is executed. When forwarding of the dial pulse signal is not completed yet, a step-advance to the step 2415 is executed. In the step 2415, forwarding of the dial pulse signal is continued. When forwarding of the dial pulse signal is completed in the step 2417, return to the step 2408 is executed, and the relay 2320 makes contact again. The following steps 2409, 2418 and 2419 are repeatedly executed. Watching of the DTMF signal is thereby continued, and detection of the CPC signal on the telephone lines 2315 and 2316 is carried out.

In the step 2402, when the bell signal is detected on the telephone line 2316, a step-advance to the step 2404 is executed. In the step 2404, watching of the bell signal on the telephone line 2315 is executed. When the bell signal is detected, return to the step 2401 is executed so as not to cause a conflict of calls, and watching of the bell signal on both telephone lines 2316 and 2315 is continued. When the bell signal is not detected on the telephone line 2315 at the step 2404, a step-advance to a step 2405 is executed. In the step 2405, the relay 2322 makes connection to the contact terminal "b", and the DTMF signal receiver 2323 is thereby connected to the telephone line 2316 of the caller's side to receive the DTMF signal. The following operation is carried out in a similar manner to the aforementioned case that the telephone line 2315 is the call line and the telephone line 2316 is the transmittal line, except that situation of both telephone lines 2315 and 2316 is contrary.

Figure 8A:
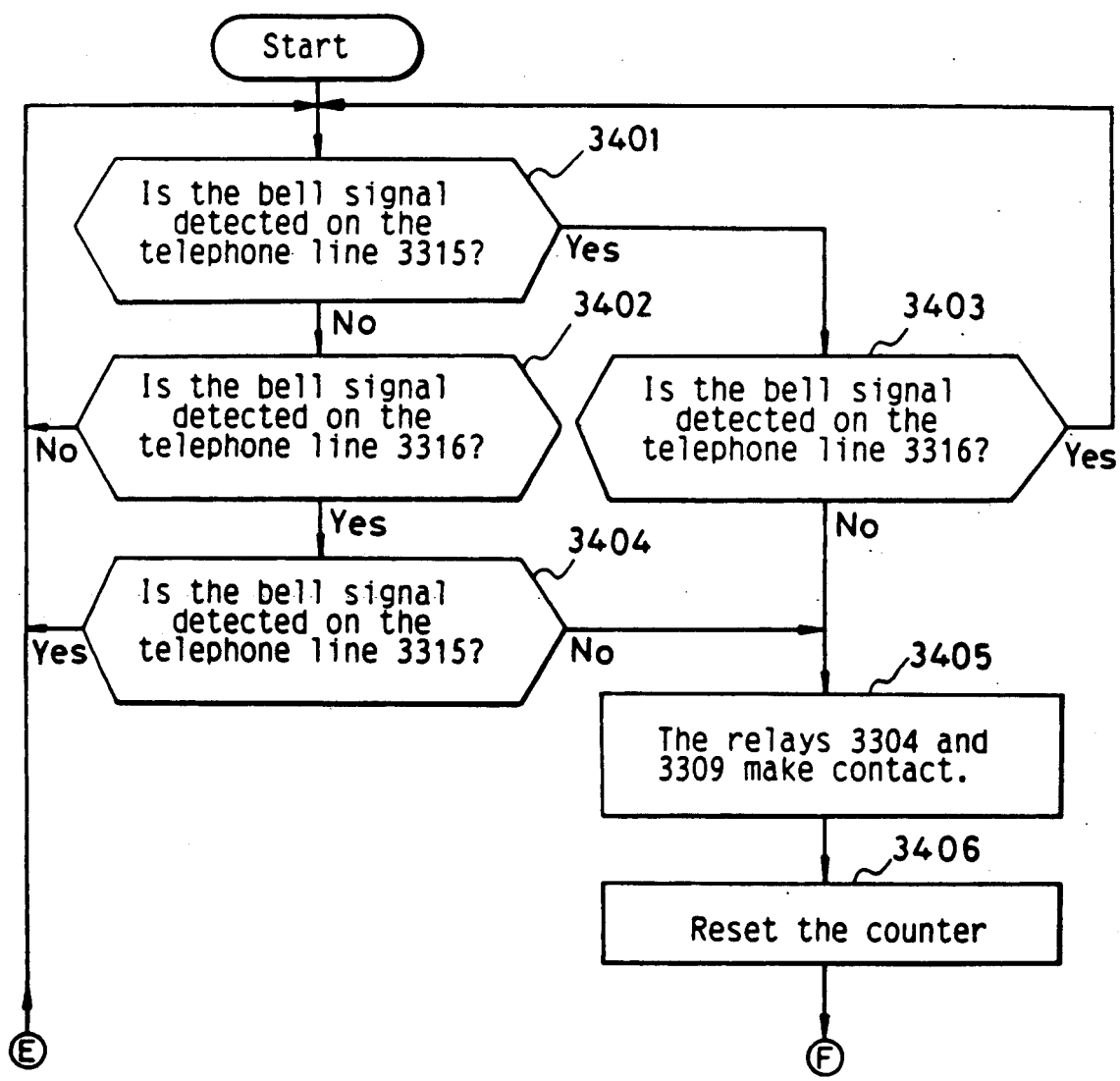
Figure 9:
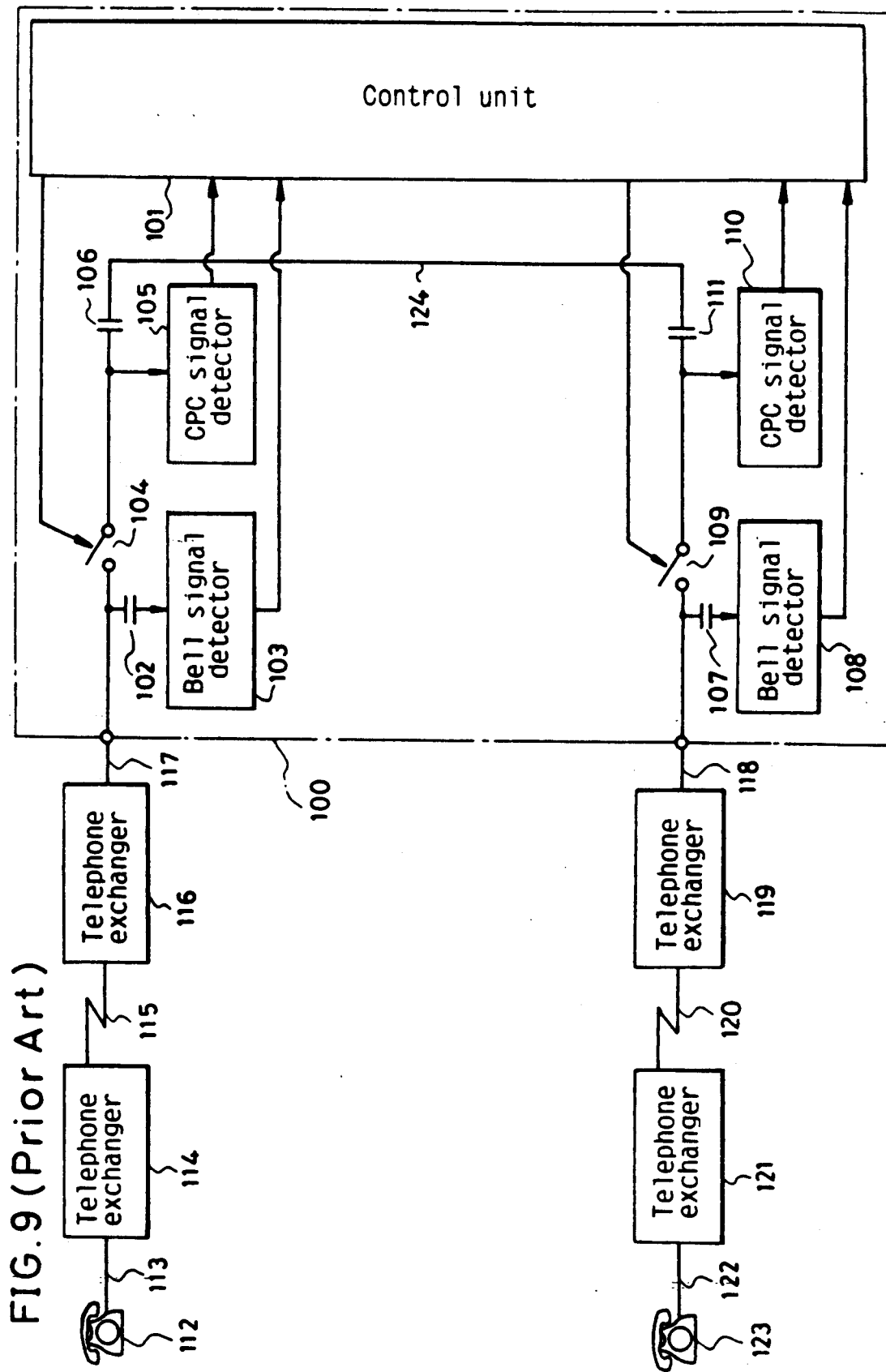
FIG. 9 is the block diagram showing the telephone-call system including the conventional telephone-call distributor.
Figure 10:
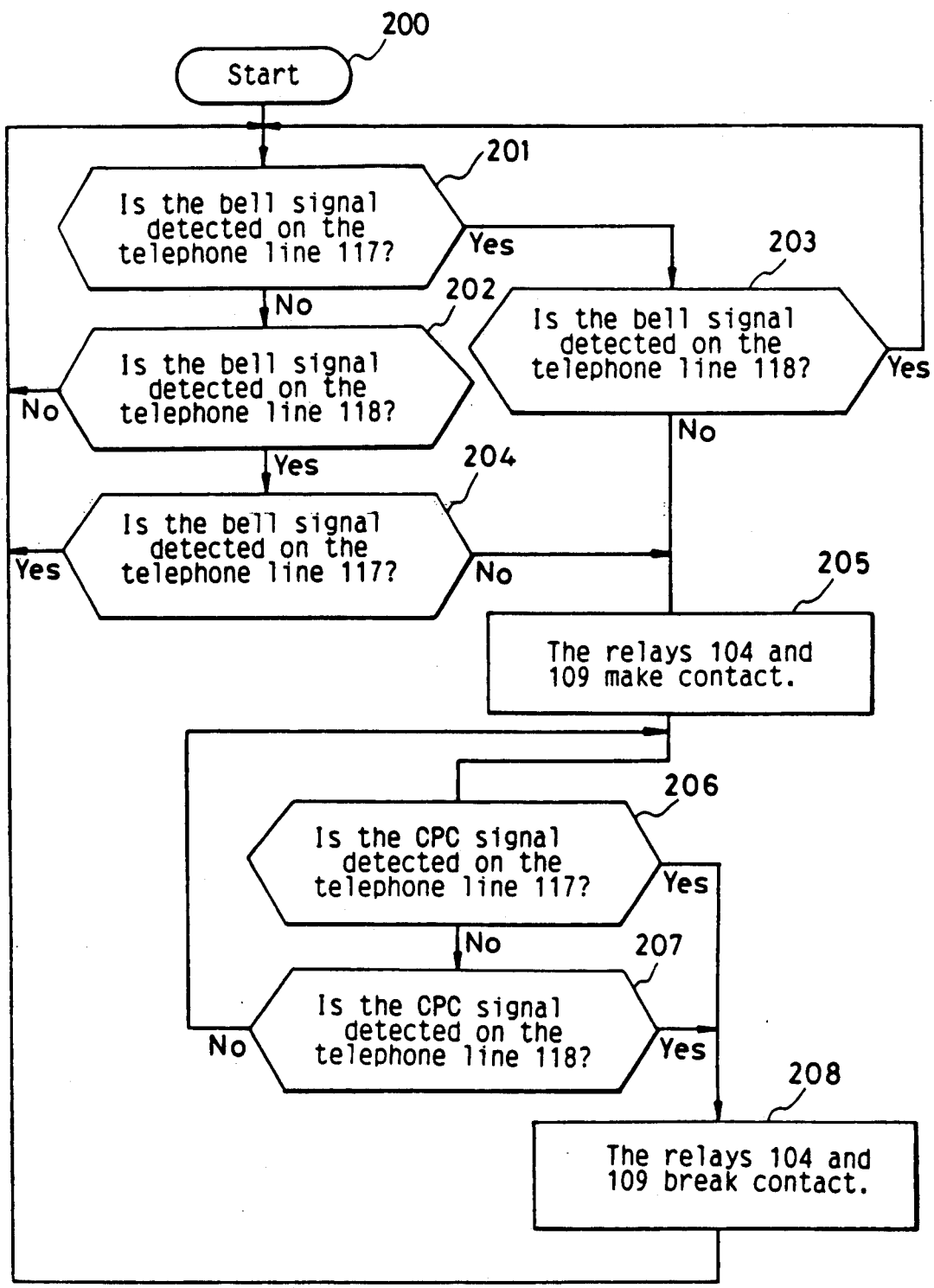
FIG. 10 is the flow chart showing operation of the telephone-call distributor shown in FIG. 9.

Next, conversion from the DTMF signal to the dial pulse signal is described with the case that the telephone line 2315 is the call line and the telephone line 2316 is the transmittal line. FIG. 8(a) is a time chart showing a signal waveform on the telephone line 2315, and it shows the DTMF signal forwarded from the telephone set 2312 via the telephone line 2313 and the telephone exchanger 2314. Numerals shown in the waveforms designate the dial data. FIG. 6(b) is an illustration showing the stored data in the buffer BF of the memory 2324. From the left, it shows a state before storing, a state stored with "0", a state stored with "1", a state stored with "2" and a state after forwarding all data. FIG. 8(c) is a time chart showing operation of the relay 2320. The relay 2320 becomes ON-state at the step 2408 and becomes OFF-state (falling of the left hand) by receiving the DTMF signal at the step 2410. After that, when all data stored in the buffer BF of the memory 2324 are forwarded and the sequential forwarding of the dial pulse signal is completed, return to the step 2408 from the step 2417 is executed. In the step 2408, the relay 2320 makes contact and keeps ON-state until the DTMF signal is received in the step 2409. FIG. 6(d) is a time chart showing an output waveform to the telephone line 2316. In the step 2414, one-digit dial pulse data are restored from the memory 2324. In the step 2415, forwarding of the dial pulse signal (P) and forwarding of the interdigit pause signal (I) are alternately carried out. Next, the dial data are restored from the memory 2324, and forwarding of the dial pulse signal of "1" is started. When forwarding of the dial pulse signal of "1" is completed, the next dial data are restored from the memory 2324, and forwarding of the dial pulse signal of "2" is started.

According to the above-mentioned second embodiment, it becomes possible to receive the DTMF signal and forward as the dial pulse signal. Therefore, when the telephone exchanger of the transmittal side is of the type which can accept only dial pulse signal, the telephone-call distributor 2300 of this embodiment can be used.

Next, a third embodiment of the present invention is described with reference to FIGS. 7 and 8.

Figure 7:
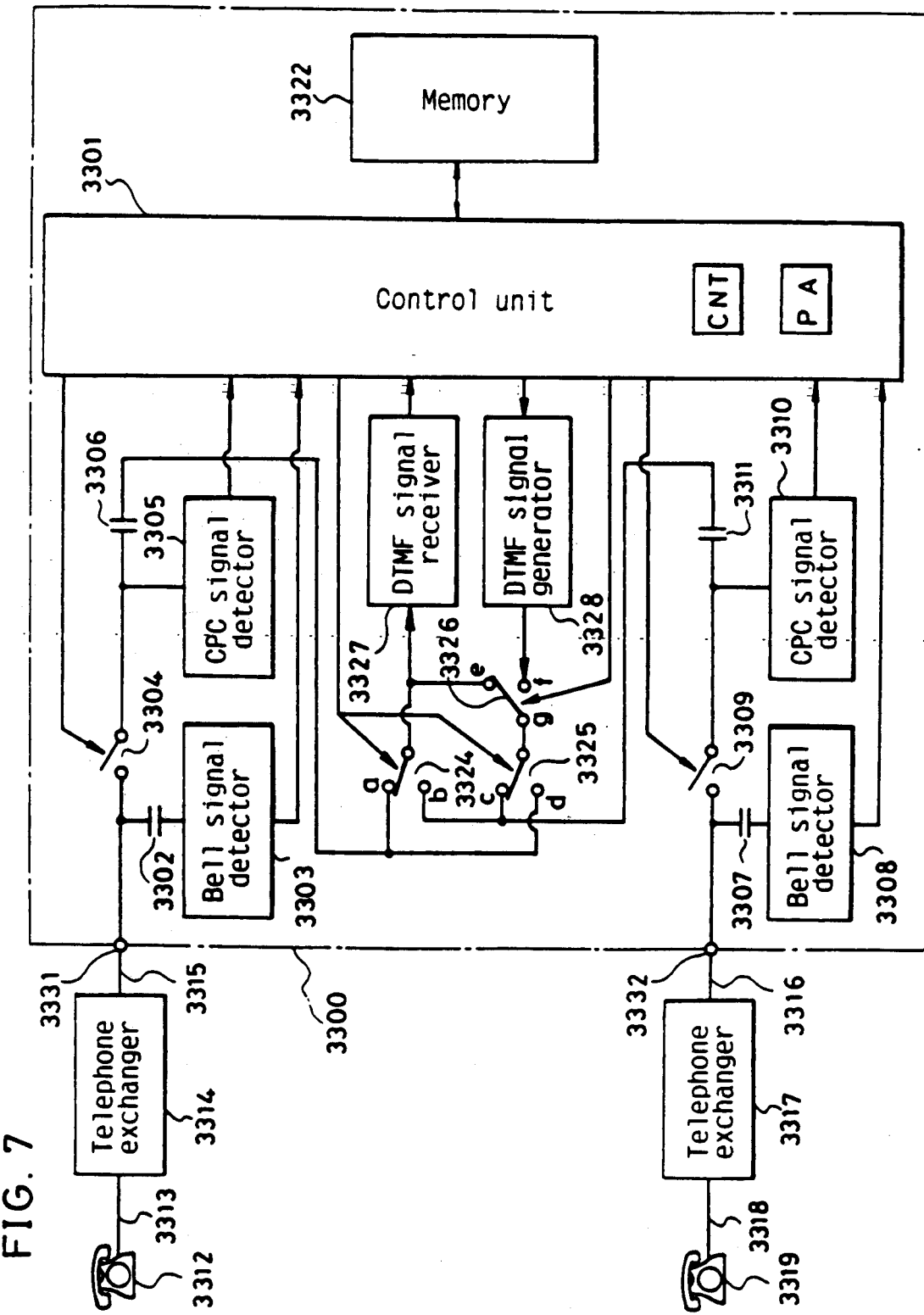
FIG. 7 is a block diagram showing a telephone-call system including a telephone-call distributor of a third embodiment of the present invention.

FIG. 7 is a block diagram showing a telephone-call system including a telephone-call distributor 3300 of the present invention. The telephone-call distributor 3300 comprises several parts encircled by a chain line and a pair of terminals 3331 and 3332. A bell signal detector 3303 detects a bell signal transmitted from a telephone exchanger 3314 through a telephone line 3315 and a capacitor 3302 which is provided to cut off D.C. signal. Output signal of the bell signal detector 3303 is inputted to a control unit 3301 in order to inform the presence of call. A relay 3304, which is provided to seize the telephone line 3315, is controlled by the control unit 3301 to make/break a D.C. loop including the telephone exchanger 3314, thereby deciding to transmit, receive or terminate. The control unit 3301 has a program area PA, for storing a control program represented by a flow chart shown in FIGS. 8(a) and 8(b), and a counter CNT for detecting lapse of time. The control unit 3300 controls the relays 3304 and 3309 in accordance with the control program stored in the program area PA. A CPC signal detector 3305 detects a CPS signal transmitted from the telephone exchanger 3314 via the telephone line 3315 and informs the control unit 3301 of the detection of CPC signal. A capacitor 3306 is provided to cut off D.C. current on the telephone line 3315 and transmit only voice band signal therethrough. Functions of a capacitor 3307 connected to a telephone exchanger 3317 through a telephone line 3316, a bell signal detector 3308, a relay 3309, a CPC signal detector 3310 and a capacitor 3311 are quite similar to functions of the capacitor 3302, the bell signal detector 3303, the relay 3304, the CPC signal detector 3305 and the capacitor 3306, respectively. Relays 3324, 3325, 3326, a DTMF receiver 3327 and a DTMF signal generator 3328 are corresponding parts to the relays 1324, 1325, 1326, the DTMF signal receiver 1327 and the DTMF signal genrator 1328 of the first embodiment (FIG. 1), and the description thereon made in the first embodiment similarly applies. A memory 3322, which is connected to the control unit 3301, is provided to store an information from the control unit 3301. Once the DTMF signal receiver 3327 receives the DTMF signal coming from the telephone line seized as the call line, information of receipt is stored in the memory 3322 as a history. Judgement of whether the bell signal is detected or not on the telephone line 3315 or 3316 is executed by the control unit 3301 according to an input signal from the bell signal detector 3303 or 3308. Further, judgement of whether the CPC signal is received or not on the telephone line 3315 or 3316 is executed by the control unit 3301 according to an input signal from the CPC signal detector 3305 or 3310. In response to the above-mentioned judgements, the relays 3304 and 3309 are controlled to make/break contact, thereby forming/breaking a D.C. loop of the telephone lines 3315 and 3316. Furthermore, judgement of whether the DTMF signal on the telephone line 3315 or 3316 is received or not is executed by the control unit 3301 according to an input signal from the DTMF signal receiver 3327. Received informations are stored in the memory 3322 and restored therefrom in accordance with the predetermined procedure.

A telephone set 3312 is placed under the control of the telephone exchanger 3314 and connected to the telephone exchanger 3314 via a telephone line 3313.

A telephone set 3319 is placed under the control of the telephone exchanger 3317 and connected to the telephone exchanger 3317 via a telephone line 3318.

FIG. 8(a) and FIG. 8(b) coupled to each other constitutes a flow chart showing operation of the above-mentioned telephone-call distributor. In an initial step 3401, judgement of whether the bell signal is detected or not on the telephone line 3315 is executed through the bell signal detector 3303. When the bell signal is not detected, a step-advance to the next step 3402 is executed.

When the bell signal is detected, another step-advance to a step 3403 is executed. In the step 3402, judgement of whether the bell signal is detected or not on the telephone line 3316 is executed through the bell signal detector 3308. When the bell signal is not detected, return to the initial step 3401 is executed, and watching of the bell signal on the telephone lines 3315 and 3316 is carried out again. When the bell signal is detected in the step 3402, a step-advance to the next step 3404 is executed. When the step-advance from the step 3401 to the step 3403 is executed through detection of the bell signal on the telephone line 3315, judgement of whether the bell signal is detected or not on the telephone line 3316 is executed in the step 3403, thereby to check whether it is able to seize the telephone line 3316 as a transmittal line. If the bell signal exists on the telephone line 3316, there occurs a conflict of calls. To avoid such conflict, return to the step 3401 is executed without seizing the telephone line 3316, and watching of the bell signal on the telephone lies 3315 and 3316 is executed again. When the bell signal is not detected on the telephone line 3316 in the step 3403, it is possible to seize the telephone line 3316 as the transmittal line. A step-advance to a step 3405 is therefore executed, and the relay 3304 makes contact (to ON-state) to thereby seize the telephone line 3315 as a call line, and the relay 3309 makes contact (to ON-state) to thereby seize the telephone line 3316 as a transmittal line. In the next step 3406, resetting of the counter CNT is executed in order to start counting of lapse of time. The counter CNT is provided to count lapse of time from seizing of the telephone lines 3315 and 3316 to receipt of the DTMF signal. In a step 3407, check of the information whether the DTMF signal has been received or not is executed. At that time, such information has been stored in the memory 3322. When the DTMF signal has been received, a jumping step-advance to the step 3412 is executed. In this stepping loop, releasing of the telephone lines 3315 and 3316 is not carried out irrespective of the predetermined lapse of time. When the DTMF signal is not received yet, a step-advance to the next step 3408 is executed. In the step 3408, judgement of whether the DTMF signal receiver 3327 now receives the DTMF signal or not is executed. When the DTMF signal is not received, a step-advance to the next step 3410 is executed. When the DTMF signal is now being received, a step-advance to a step 3409 is executed. In the step 3409, an information such that the DTMF signal has been already received is stored in the memory 3322, and a jumping step-advance to a step 3412 is executed. The above-mentioned information is used to make the judgement in the step 3407 at the next time. When the DTMF signal is not received in the step 3408, a step-advance to a step 3410 is executed. In the step 3410, counting value of the counter CNT, which is reset at the step 3406, increases one. In the next step 3411, judgement of whether the counting value of the counter CNT reaches the predetermined value is executed. When the counting value reaches the predetermined value, a jumping step-advance to a step 3414 is executed. In the step 3414, the relays 3304 and 3309 breaks the contact to thereby release the telephone lines 3315 and 3316, and return to the step 3401 is executed. When the counting value does not reach the predetermined value, a step-advance to a step 3412 is executed. In the step 3412, judgement of whether the CPC signal is detected on the telephone line 3315 or not is executed. Also, in the subsequent step 3413, judgement of whether the CPC signal is detected on the telephone line 3316 or not is executed. In both steps 3412 and 3413, when the CPC signal is not detected, return to the step 3407 is executed. That is, when no DTMF signal is detected after seizing of the telephone line 3315 and 3316, the steps 3407, 3408, 3410, 3411, 3412 and 3413 are repeatedly executed until the counting value reaches the predetermined value in the step 3411 or the CPC signal is detected on any of the telephone line 3315 and 3316 in the steps 3412 and 3413. Once the DTMF signal is detected after seizing of the telephone lines 3315 and 3316 at the step 3408, the steps 3407, 3412 and 3413 are repeatedly executed until the CPC signal is detected in the steps 3412 and 3413. When the DTMF signal is detected on the telephone lines 3315 and 3316 at the step 3412 or 3413, a step-advance to the step 3414 is executed, and the relays 3304 and 3309 break contact to thereby release the telephone lines 3315 and 3316. Talkable state is thus terminated. After that, return to the step 3401 is executed, and watching of the bell signal on the telephone line 3315 and 3316 is carried out again.

In the step 3402, when the bell signal is detected on the telephone line 3316, a step-advance to the step 3404 is executed. In the step 3404, watching of the bell signal on the telephone line 3315 is executed. When the bell signal is detected, return to the step 3401 is executed so as not to cause a conflict of calls, and watching of the bell signal on both telephone lines 3316 and 3315 is continued. When the bell signal is not detected on the telephone line 3315 at the step 3404, a step-advance to the step 3405 is executed. In the step 3405, the relay 3304 makes contact in order to seize the telephone line 3315 as the transmittal line, and the relay 3309 makes the contact in order to seize the telephone line 3316 as the call line. The following operation is carried out in a similar manner to the aforementioned case that the telephone line 3315 is the call line and the telephone line 3316 is the transmittal line, except that situation of both telephone lines 3315 and 3316 is contrary.

In the abvove-mentioned third embodiment, when the DTMF signal is not detected from the telephone line 3315 or 3316 seized as the call line for the predetermined time after seizing of the telephone lines 3315 and 3316, the telephone lines 3315 and 3316 are released. Therefore, waste of the charge for telephone-call can be prevented, and the telephone lines 3315 and 3316 are used to the best advantage.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereafter claimed.

What is claimed is:

1. A telephone-call distributor comprising:
    signal receiving means for receiving a first DTMF signal coming from a first telephone line and outputting a dial data signal;
    control means for receiving said dial data signal from said signal receiving means;
    signal generating means, responsive to said control means, for generating a second DTMF signal having a same code as said dial data signal;
    forwarding means for forwarding said second DTMF signal generated by said signal generating means to a second telephone line; and connecting means, responsive to said control means, for connecting said first telephone line with said second telephone line to thereby make a speaking circuit therebetween, said first telephone line being connected to a first telephone set and said second telephone line being connected to a second telephone set.

2. A telephone-call distributor in accordance with claim 1, further comprising:
detecting means for detecting said dial data signal coming from said first telephone line.

3. A telephone-call distributor comprising:
signal receiving means for receiving a dial data signal coming from a first telephone line;
memory means for storing data of said dial data signal;
signal generating means for generating another dial data signal having a different form from said dial data signal received by said signal receiving means, said another dial data signal being generated in accordance with said data;
forwarding means for forwarding said dial data signal generated by said signal generating means to a second telephone line; and
connecting means for connecting said first telephone line with said second telephone line to thereby make a speaking circuit therebetween, said first telephone line being connected to a first telephone set and said second telephone line being connected to a second telephone set.

4. A telephone-call distributor in accordance with claim 3, wherein
said signal receiving means receives a DTMF signal.

5. A telephone-call distributor in accordance with claim 3 or 4, wherein said signal generating means generates a pulse signal.

6. A telephone-call distributor in accordance with claim 3, further comprising:
detecting means for detecting said dial data signal coming from said first telephone line.

7. A telephone-call distributor comprising:
a plurality of terminals which are to be connected to plural telephone lines, respectively;
detecting means for detecting a presence of a call on said telephone lines;
signal receiving means for receiving a first dial data signal coming from a telephone line on which said presence of said call is detected by said detecting means;
signal generating means for generating a second dial data signal having a same code as said first dial data signal received by said signal receiving means;
forwarding means for forwarding said dial data signal generated by said signal generating means to another of said telephone line via another of said terminals; and
connecting means for connecting said telephone lines with each other to thereby make a speaking circuit between a telephone set connected to one of said telephone lines and a telephone set connected to another of said telephone lines.

8. A telephone-call distributor in accordance with claim 7, wherein
said signal receiving means receives a DTMF signal.

9. A telephone-call distributor in accordance with claim 8, wherein
said signal generating means generates a DTMF signal.

10. A telephone-call distributor in accordance with claim 8, wherein
said signal generating means generates a pulse signal.

11. A telephone-call distributor comprising:
a plurality of terminals which are to be connected to plural telephone lines, respectively;
detecting means for detecting presence of call on said telephone lines;
switch means for electrically seizing a telephone line on which presence of call is detected by said detecting means;
signal receiving means for receiving a dial data signal coming from said telephone line seized by said switch means;
a counter for counting lapse of time from seizing of said telephone line to receipt of said dial data signal;
control means, which opens said switch means at the time when said dial data signal is not received yet by predetermined lapse of time, to electrically release said telephone line;
signal generating means for generating a dial data signal having the same code as that of said dial data signal received by said signal receiving means; and
forwarding means for forwarding said dial data signal generated by said signal generating means to another of said telephone lines.

12. A telephone-call distributor comprising:
signal receiving means for receiving a first dial data signal coming from a first telephone line;
signal generating means for generating a second dial data signal having a same code as said first dial data signal received by said signal receiving means;
forwarding means for forwarding said second dial data signal generated by said signal generating means to a second telephone line; and
connecting means for connecting said first telephone line with said second telephone line to thereby make a speaking circuit between a first telephone set connected to said first telephone line and a second telephone set connected to said second telephone line.

* * * * *